(12) United States Patent
Frazier et al.

(10) Patent No.: US 6,981,025 B1
(45) Date of Patent: Dec. 27, 2005

(54) METHOD AND APPARATUS FOR ENSURING SCALABLE MASTERSHIP DURING INITIALIZATION OF A SYSTEM AREA NETWORK

(75) Inventors: Giles Roger Frazier, Austin, TX (US); Danny Marvin Neal, Round Rock, TX (US); Gregory Francis Pfister, Austin, TX (US); Steven Mark Thurber, Austin, TX (US); Dono Van-Mierop, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 09/692,341

(22) Filed: Oct. 19, 2000

(51) Int. Cl.$^7$ .................................. G06F 15/16
(52) U.S. Cl. ........................... 709/209; 709/223
(58) Field of Search .................. 709/208, 209, 709/223, 234; 700/3, 94, 101; 712/31; 370/225, 370/254; 714/1, 47

(56) References Cited

U.S. PATENT DOCUMENTS

| | | | |
|---|---|---|---|
| 4,638,356 A | 1/1987 | Frezza ....................... 358/118 |
| 4,951,225 A | 8/1990 | Lee et al. ................... 364/513 |
| 5,043,981 A | 8/1991 | Firoozmand et al. ....... 370/85.1 |
| 5,185,741 A * | 2/1993 | Iguchi et al. ............... 370/384 |
| 5,402,416 A | 3/1995 | Cieslak et al. ............... 370/60 |
| 5,513,368 A | 4/1996 | Garcia, Jr. et al. .......... 395/842 |
| 5,551,066 A * | 8/1996 | Stillman et al. ............. 455/69 |
| 5,610,980 A | 3/1997 | Johnson et al. .............. 380/4 |
| 5,617,424 A | 4/1997 | Murayama et al. ......... 370/389 |
| 5,719,938 A | 2/1998 | Haas et al. .................. 380/21 |
| 5,758,083 A * | 5/1998 | Singh et al. ................. 709/223 |
| 5,778,176 A | 7/1998 | Geihs et al. ............. 395/200.12 |
| 5,805,072 A * | 9/1998 | Kakemizu .................... 370/408 |
| 6,032,191 A | 2/2000 | Chowdhury et al. ........ 709/238 |
| 6,081,752 A | 6/2000 | Benson, IV et al. ......... 700/79 |
| 6,085,238 A | 7/2000 | Yuasa et al. ................. 709/223 |
| 6,108,739 A | 8/2000 | James et al. ................. 710/113 |
| 6,115,776 A | 9/2000 | Reid et al. ................... 710/260 |
| 6,128,738 A | 10/2000 | Doyle et al. ................. 713/185 |
| 6,222,822 B1 | 4/2001 | Gerardin et al. ............ 370/230 |
| 6,269,396 B1 | 7/2001 | Shah et al. .................. 709/223 |
| 6,304,973 B1 | 10/2001 | Williams ..................... 713/201 |

(Continued)

FOREIGN PATENT DOCUMENTS

| JP | 2002064587 | 4/2002 | ........... G06F 15/16 |
|---|---|---|---|

(Continued)

OTHER PUBLICATIONS

Nehmer et al, "A Fault Tolerance Approach for Distributed ISDN Control Systems", ACM SIGOPS European Workshop, Proceedings of the fourth workshop on ACM SIGOPS European workshop, 1990, Bologna, Italy, 1990, pp. 1-4.

*Primary Examiner*—Marc D. Thompson
(74) *Attorney, Agent, or Firm*—Duke W. Yee; Mark E. McBurney; Wayne P. Bailey

(57) ABSTRACT

A method in a network computing system for managing a plurality of subnet managers in the network computing system. An identification is received of a set of subnet managers within the plurality of subnet managers. The set of subnet managers is allowed to participate in a master election to select a master subnet manager. Subnet managers other than the set of subnet managers are placed in a dormant state. The master subnet manager is elected from the set of subnet managers through the master election, wherein other subnet managers within the number of subnet managers poll the master subnet manager to allow the other subnet managers to elect a new master subnet manager if the master subnet manager fails.

18 Claims, 6 Drawing Sheets

U.S. PATENT DOCUMENTS

| | | | |
|---|---|---|---|
| 6,341,322 B1 | 1/2002 | Liu et al. .................... | 710/129 |
| 6,343,320 B1 * | 1/2002 | Fairchild et al. ............ | 709/224 |
| 6,363,411 B1 | 3/2002 | Dugan et al. ............... | 709/202 |
| 6,363,495 B1 | 3/2002 | MacKenzie et al. .......... | 714/4 |
| 6,421,779 B1 | 7/2002 | Kuroda et al. .............. | 713/169 |
| 6,434,113 B1 * | 8/2002 | Gubbi ....................... | 370/216 |
| 6,470,397 B1 | 10/2002 | Shah et al. ................. | 709/250 |
| 6,507,592 B1 | 1/2003 | Hurvig et al. .............. | 370/503 |
| 6,597,956 B1 * | 7/2003 | Aziz et al. .................... | 700/3 |
| 6,636,520 B1 | 10/2003 | Jason et al. ................ | 370/401 |
| 6,654,363 B1 | 11/2003 | Li et al. .................... | 370/338 |
| 6,658,417 B1 | 12/2003 | Stakutis et al. .............. | 707/10 |
| 6,664,978 B1 | 12/2003 | Kekic et al. ................ | 345/733 |
| 6,665,714 B1 | 12/2003 | Blumenau et al. .......... | 709/222 |
| 6,708,272 B1 | 3/2004 | McCown et al. ........... | 713/151 |
| 2002/0021307 A1 | 2/2002 | Glenn et al. ................ | 345/753 |
| 2002/0026517 A1 | 2/2002 | Watson, Jr. ................. | 709/228 |
| 2002/0073257 A1 | 6/2002 | Beukema et al. ........... | 710/105 |
| 2002/0133620 A1 | 9/2002 | Krause ...................... | 709/238 |
| 2003/0018787 A1 | 1/2003 | Neal et al. .................. | 709/227 |
| 2003/0046505 A1 | 3/2003 | Craddock et al. ........... | 711/165 |
| 2004/0057424 A1 | 3/2004 | Kokkonen .................. | 370/352 |

FOREIGN PATENT DOCUMENTS

| | | | | |
|---|---|---|---|---|
| WO | WO 00/72159 | 11/2000 | ........... | G06F 13/00 |

* cited by examiner

METHOD AND APPARATUS FOR ENSURING SCALABLE MASTERSHIP DURING INITIALIZATION OF A SYSTEM AREA NETWORK

CROSS REFERENCES TO RELATED APPLICATIONS

The present invention is related to applications entitled A System Area Network of End-to-End Context via Reliable Datagram Domains, Ser. No. 09/692,354, pending; Method and Apparatus for Pausing a Send Queue without Causing Sympathy Errors, Ser. No. 09/692,340, issued as U.S. Pat. No. 6,766,467; Method and Apparatus to Perform Fabric Management, Ser. No. 09/692,344, pending End Node Partitioning using LMC for a System Area Network, Ser. No. 09/692,351, pending; Method and Apparatus for Dynamic Retention of System Area Network Management Information in Non-Volatile Store, Ser. No. 09/692,365, pending; Method and Apparatus for Retaining Network Security Settings Across Power Cycles, Ser. No. 09/692,337, pending; Method and Apparatus for Reporting Unauthorized Attempts to Access Nodes in a Network Computing System, Ser. No. 09/692,348, pending; Method and Apparatus for Reliably Choosing a Master Network Manager During Initialization of a Network Computing System, Ser. No. 09/692,346, pending; and Method and Apparatus for Using a Service ID for the Equivalent of Port ID in a Network Computing System, Ser. No. 09/692,352, abandoned, all of which are filed even date hereof, assigned to the same assignee, and incorporated herein by reference.

BACKGROUND OF THE INVENTION

1. Technical Field

The present invention relates generally to an improved data processing system, and in particular to a method and apparatus for initializing a network computing system. Still more particularly, the present invention provides a method and apparatus for scaling mastership in a network computing system.

2. Description of Related Art

In a System Area Network (SAN), the hardware provides a message passing mechanism which can be used for Input/Output devices (I/O) and interprocess communications between general computing nodes (IPC). Processes executing on devices access SAN message passing hardware by posting send/receive messages to send/receive work queues on a SAN channel adapter (CA). These processes also are referred to as "consumers". The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

SUMMARY OF THE INVENTION

The present invention provides a method in a network computing system for managing a plurality of subnet managers in the network computing system. An identification is received of a set of subnet managers within the plurality of subnet managers. The set of subnet managers is allowed to participate in a master election to select a master subnet manager. Subnet managers other than the set of subnet managers are placed in a dormant state. The master subnet manager is elected from the set of subnet managers through the master election, wherein other subnet managers within the number of subnet managers poll the master subnet manager to allow the other subnet managers to elect a new master subnet manager if the master subnet manager fails.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a network computing system having end nodes, switches, routers, and links interconnecting these components. Each end node uses send and receive queue pairs to transmit and receives messages. The end nodes segment the message into packets and transmit the packets over the links. The switches and routers interconnects the end nodes and route the packets to the appropriate end node. The end nodes reassemble the packets into a message at the destination.

Figure 1:
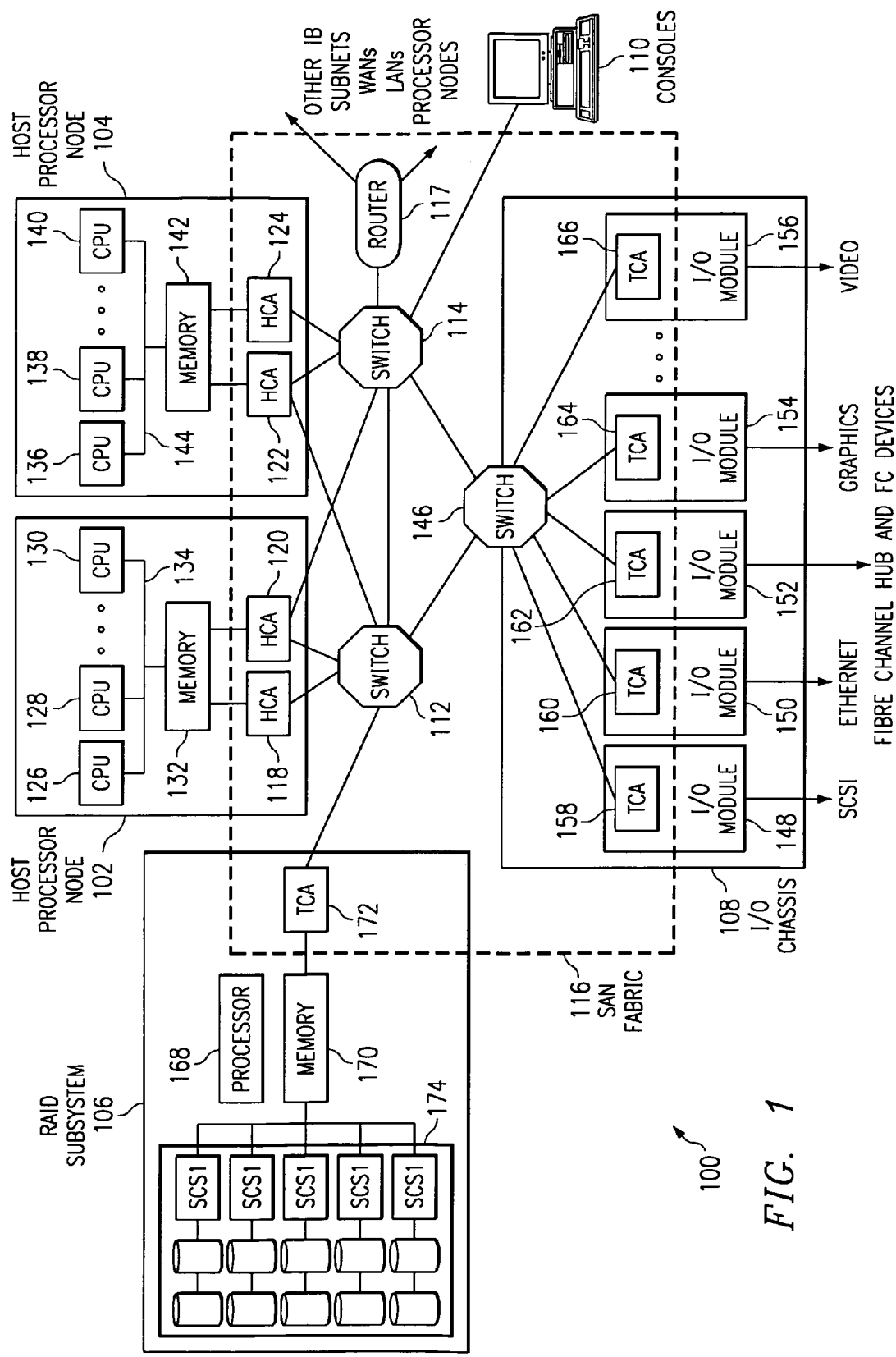
FIG. 1 is a diagram of a network computing system is illustrated in accordance with a preferred embodiment of the present invention.

With reference now to the figures and in particular with reference to FIG. 1, a diagram of a network computing system is illustrated in accordance with a preferred embodiment of the present invention. The network computing system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the network computing system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an end node, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in network computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a network computing system. The SAN 100 shown in FIG. 1 includes a switched communications fabric 116, which allows many devices to concurrently transfer data with high-bandwidth and low latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the network computing system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers.

The I/O chassis 108 in FIG. 1 include an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in network computing system. With an I/O adapter attached to the SAN 100, the resulting I/O adapter node has substantially the same communication capability as any host processor node in SAN 100.

Figure 2:
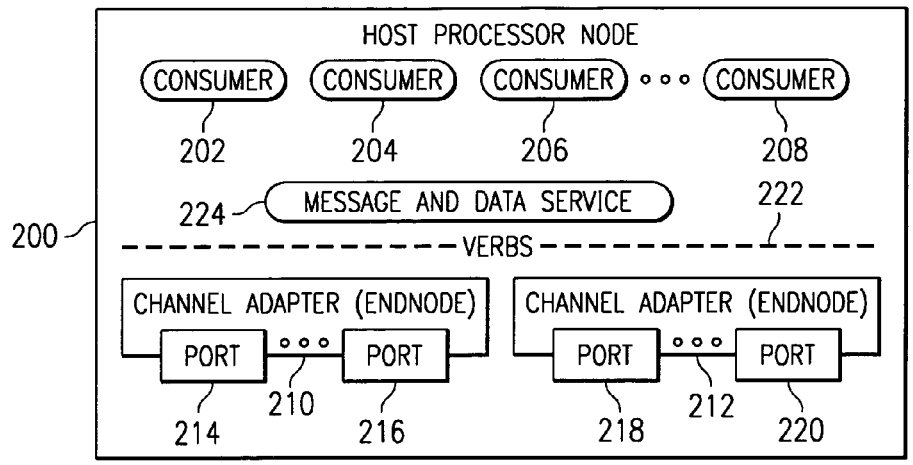
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200, shown in FIG. 2, includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212. Message and data service 224 provides an interface to consumers 202–208 to process messages and other data.

Figure 3:
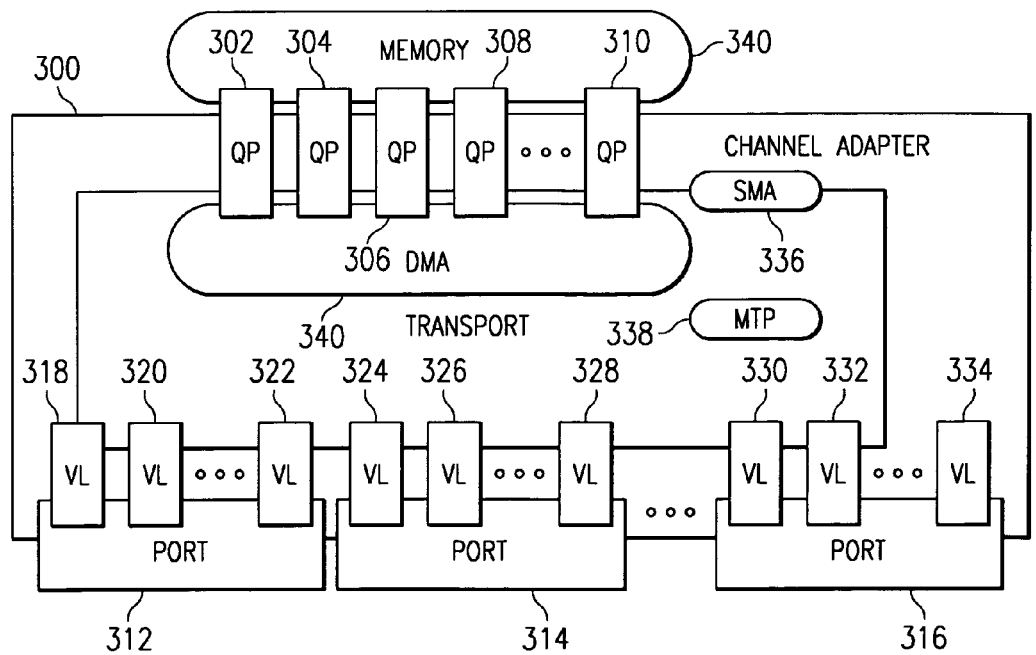
FIG. 3 is a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 340 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
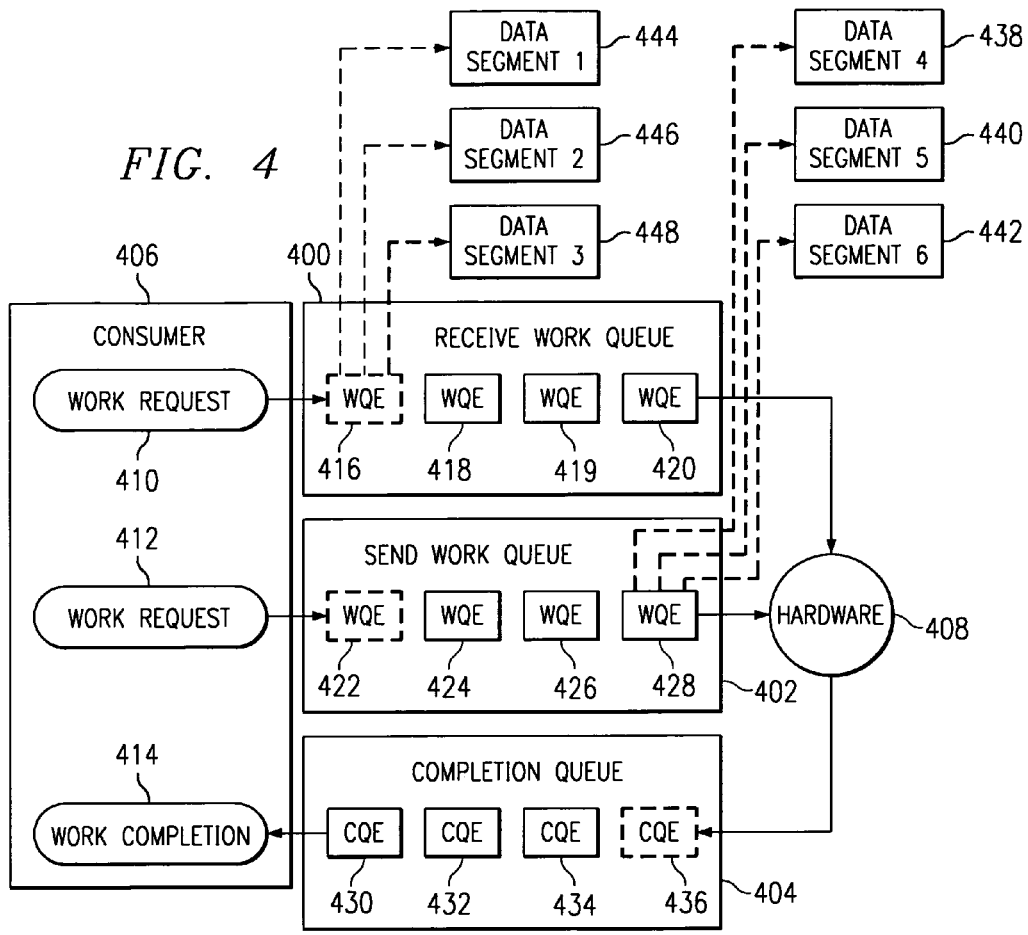
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote end node and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a network computing system implementing the present invention supports four types of transport services.

Reliable and unreliable connected services associate a local queue pair with one and only one remote queue pair. Connected services require a process to create a queue pair for each process which is to communicate with over the SAN fabric. Thus, if each of N host processor nodes contain P processes, and all P processes on each node wish to communicate with all the processes on all the other nodes, each host processor node requires $p^2 \times (N-1)$ queue pairs. Moreover, a process can connect a queue pair to another queue pair on the same host channel adapter.

Reliable datagram service associates a local end—end (EE) context with one and only one remote end—end context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an end node with a fixed number of queue pairs can communicate with far more processes and end nodes with a reliable datagram service than with a reliable connection transport service. For example, if each of N host processor nodes contain P processes, and all P processes on each node wish to communicate with all the processes on all the other nodes, the reliable connection service requires $p^2 \times (N-1)$ queue pairs on each node. By comparison, the connectionless reliable datagram service only requires P queue pairs+(N−1) EE contexts on each node for exactly the same communications.

The unreliable datagram service is connectionless. The unreliable datagram service is employed by management applications to discover and integrate new switches, routers, and end nodes into a given network computing system. The unreliable datagram service does not provide the reliability guarantees of the reliable connection service and the reliable datagram service. The unreliable datagram service accordingly operates with less state information maintained at each end node.

Figure 5:
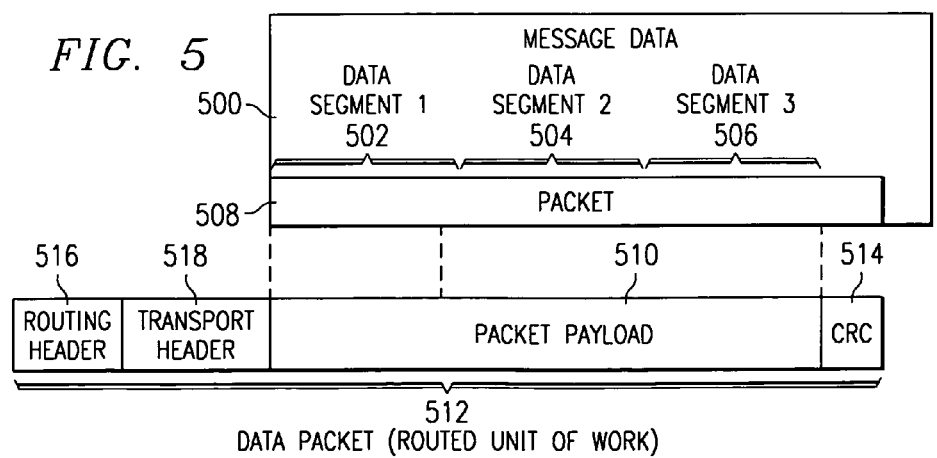
FIG. 5 is an illustration of a data packet in accordance with a preferred embodiment of the present invention.

Turning next to FIG. 5, an illustration of a data packet is depicted in accordance with a preferred embodiment of the present invention. Message data 500 contains data segment 1 502, data segment 2 504, and data segment 3 506, which are similar to the data segments illustrated in FIG. 4. In this example, these data segments form a packet 508, which is placed into packet payload 510 within data packet 512. Additionally, data packet 512 contains CRC 514, which is used for error checking. Additionally, routing header 516 and transport 518 are present in data packet 512. Routing header 516 is used to identify source and destination ports for data packet 512. Transport header 518 in this example specifies the destination queue pair for data packet 512.

Additionally, transport header 518 also provides information such as the operation code, packet sequence number, and partition for data packet 512. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an endnode may be configured to be members of one or more possibly overlapping sets called partitions.

SAN architecture management facilities provide for a subnet manager and an infrastructure that supports a number of general management services. The management infrastructure requires a subnet management agent in each node and defines a general service interface that allows additional general services agents. The SAN architecture includes a common management datagram (MAD) message structure for communicating between managers and management agents.

The subnet manager is an entity attached to a subnet that is responsible for configuring and managing switches, routers, and channel adapters. The subnet manager can be implemented with other devices, such as a channel adapter or a switch. The master subnet manager: (1) discovers the subnet topology; (2) configures each channel adapter port with a range of Local Identification (LID) numbers, Global Identification (GID) number, subnet prefix, and Partition Keys (P_Keys); (3) configures each switch with a LID, the subnet prefix, and with its forwarding database; and (4) maintains the endnode and service databases for the subnet and thus provides a Global Unique Identification (GUID) number to LID/GID resolution service as well as a services directory.

Each node provides a subnet manager agent that the subnet manager accesses through a well known interface called the subnet management interface (SMI). Subnet manager interface allows for both LID routed packets and directed routed packets. Directed routing provides the means to communicate before switches and end nodes are configured.

SAN subnet management packets (SMPS) use an management key (M_Key) as an access control mechanism. When the subnet manager takes management control of a node, the subnet manager pushes its M_Key, along with a M_Key lease period, into each SAN component. The SAN component uses this M_Key to validate all future subnet management packets it receives within the M_Key lease period. Subsequent subnet management packets (SMPs) have their M_Key field compared with the value previously stored by subnet manager in the SAN component. If a M_Key field in a subnet management packet matches the M_Key value stored in the SAN component, the packet is accepted. Otherwise the packet is discarded.

The SAN architecture supports the notion of multiple subnet managers per subnet and specifies how multiple subnet managers negotiate for one to become the master subnet manager. Once a subnet manager gains control of a subnet, it can retain control as long as it does not lose its M_Key in the components of the subnet. Loss of the M_Key can happen under several circumstances. This loss can happen through a power cycle of the component which contains the M_Key, with the component coming up with the default M_Key when the power to the component is restored. This loss also may happen through a boot of the node which contains the subnet manager, such that the subnet manager goes away and the M_Key lease period expires in the component, in which case another subnet manager can take over control of the component.

The SAN architecture, in these examples, also supports the notion of a SM_Key. The SM_Key provides a additional level of authentication authority to control which subnet manager is allowed to be the master subnet manager. This also provides another level of granularity in determining which subnet managers are trusted in establishing standby subnet managers, that can backup the master subnet manager for redundancy and handoff.

When a SAN network is initializing, a priority scheme determines which of the potential subnet managers has the highest priority and therefore actually becomes the master subnet manager over the subnet. However, the lower-priority subnet managers-must poll the master to ensure that they will be able to take over if it fails during initialization, or if parameters are changed after the initialization process. However, SAN subnets can be very large, so it is possible that the polling involved could be a severe drain on the master's resources, keeping the master from completing initialization, maintaining normal management operations, or in even not being able to respond to the poll in time so it is erroneously considered out of operation. The latter would be considered a catastrophic failure, leading to the subnet never correctly being initialized.

In addition, it is desirable to allow a customer to select who will be the subnet manager and standby subnet managers, in order to obtain the desired management functionality.

To prevent these problems, it is desirable to provide a solution which allows an out-of-band subnet manager priority override, which allows both SAN scalability and enhanced functionality. This invention solves the problems above by having the SAN component provide an out-of-band mechanism allowing the customer to specify specific (or override previously set) priority levels for each potential subnet manager, and allow only a limited number of end nodes (that could participate as potential subnet managers) to actually participate in the discovery and initialization process and polling scheme. A node that is enabled participates in the master election and polling, and a node that is not enabled is not allowed to participate. Customers can then configure the system so that an adequate number of potential masters exist for redundancy, without overwhelming the master with polling requests.

Figure 6:
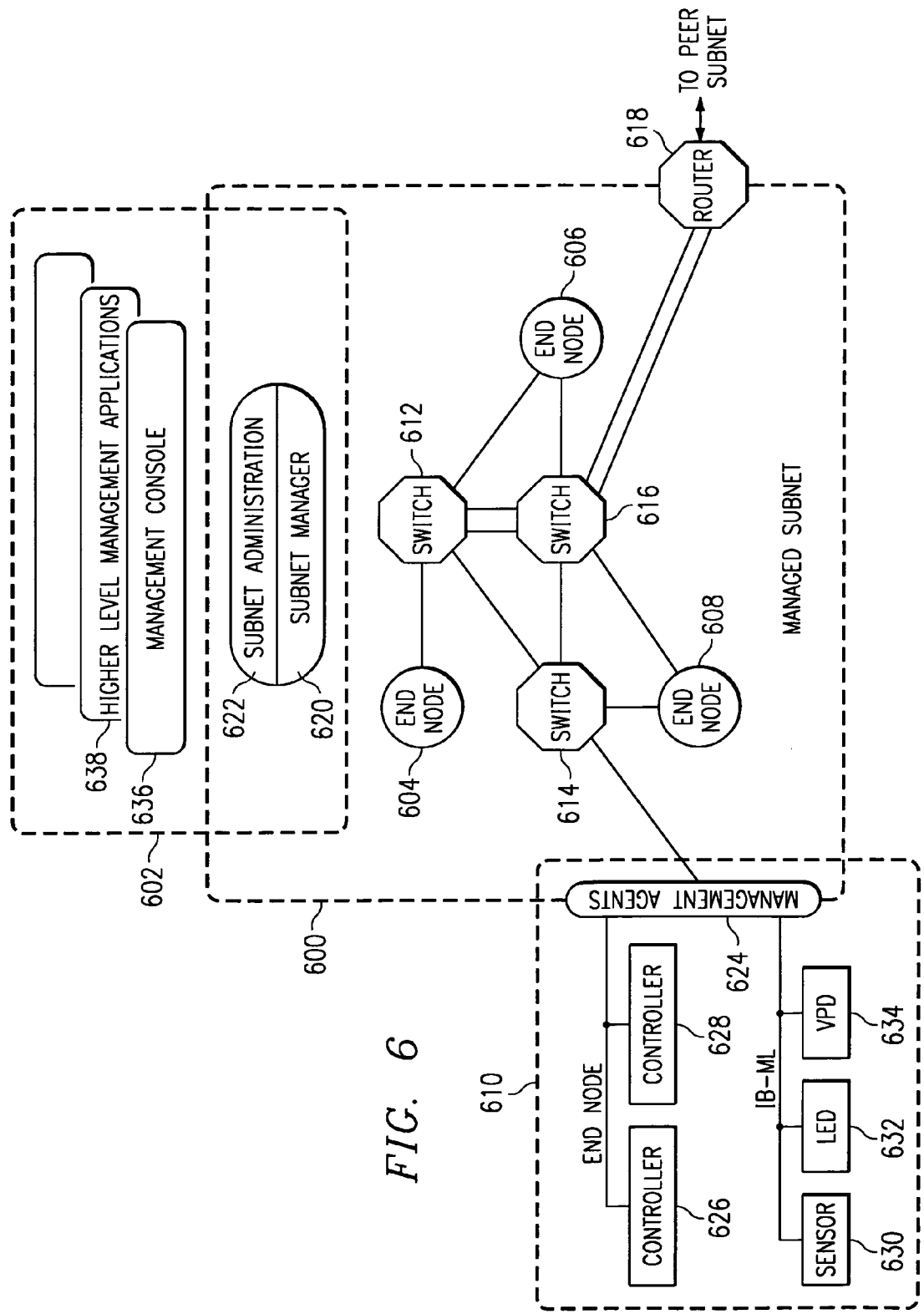
FIG. 6 is a diagram illustrating a system area network (SAN) management model in accordance with a preferred embodiment of the present invention.

Turning next to FIG. 6, a diagram illustrating a system area network (SAN) management model is depicted in accordance with a preferred embodiment of the present invention. In FIG. 6, the management of subnet 600 and SAN components like host processor node 602, end nodes 604–610, switches 612–616, and router 618 use two management services: subnet manager 620 and subnet administration 622. These two components are located in host node 602 in this example. A host node is also referred to as a host channel adapter and an end node is also referred to as a target channel adapter. Subnet manager packets are used to discover, initialize, configure, and maintain SAN components through the management agent 624 in end node 610. In this example, end node 610 includes a controller 626, controller 628, sensor 630, light emitting diode (LED) 632, and vital product data (VPD) 634.

SAN subnet administration packets are used by SAN components to query and update subnet management data. Control of some aspects of the subnet management are through a user management console 636 in a host processor node 602. Additionally, higher level management applications 638 may be used in place of or in conjunction with management console 636 to manage and configure subnet 600.

Figure 7:
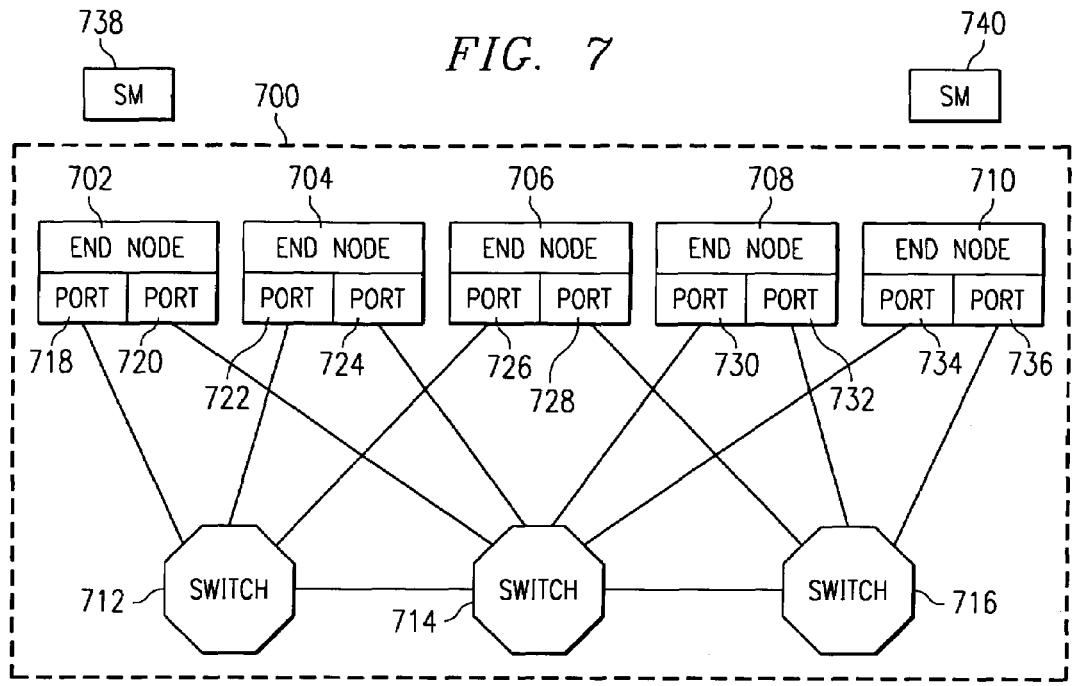
FIG. 7 is a diagram illustrating relations between subnet managers and subnet manager agents in accordance with a preferred embodiment of the present invention.

Turning next to FIG. 7, a diagram illustrating relations between subnet managers and subnet manager agents is depicted in accordance with a preferred embodiment of the present invention. In this example, subnet manager agents include end nodes 702–710 and switches 712–716. End nodes 702–710 include ports 718–736. Subnet 700 can have multiple subnet managers. In this example, subnet manager 738 and subnet manager 740 arbitrate to determine which will become the master subnet manager, and the master subnet manager will then configure and control subnet 700.

Subnet managers, such as subnet manager 738 and subnet manager 740, send SAN subnet management packets containing a management key (M_Key) as an access control mechanism. When a subnet manager takes management control of a component, such as end node 702 or switch 712, the subnet manager pushes its M_Key, along with a M_Key lease period, into the component. When the M_Key protection bits are appropriately set in the component, the component uses this M_Key to validate all future subnet management packets it receives within the M_Key lease period. Subsequent subnet management packets (SMPs) have their M_Key field compared with the value previously stored by the subnet manager on the component. If a subnet management packet has a M_Key field that matches the M_Key value stored in the SAN component, the packet is accepted. Otherwise, the packet is discarded.

Figure 8:
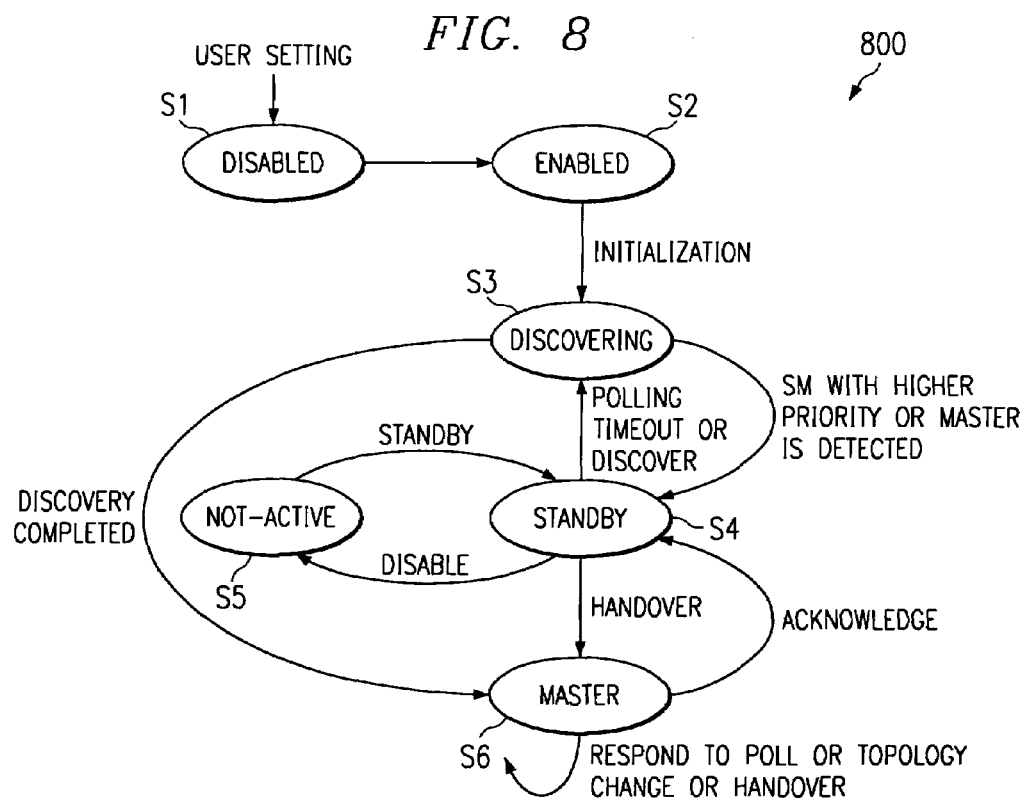
FIG. 8 is a state machine diagram for initializing a subnet manager in accordance with a preferred embodiment of the present invention.

Turning next to FIG. 8, a state machine diagram for initializing a subnet manager is depicted in accordance with a preferred embodiment of the present invention. State machine 800 may be used to enable or disable the subnet manager. In these examples, each subnet manager implements a state machine 800. The subnet manager may be placed into disabled state S1 through a user setting at a management console application, such as management console 636 in FIG. 6. In this example, disabled state occurs with a subnet management setting of an appropriate field. In disabled state S1, no other actions occur for the particular subnet manager that has been disabled. If the subnet manager is disabled, then that subnet manager cannot participate in the process used to identify a master subnet manager. Subnet managers may be disabled by a user to limit the number of potential subnet managers allowed to participate in the arbitration processes for determining which subnet manager will become the master subnet manager. This improves scalability of the fabric by allowing the user to limit the number of standby subnet managers, and thus limit the amount of polling the master subnet master has to deal with. Another reason a user may disable a subnet manager, is to prevent undesirable subnet managers from even attempting to become subnet managers. In one embodiment, a disable bit such as IsSMDisabled could be used to indicate the disabled state when IsSMDisabled equals 1. In another embodiment, a negative subnet manager arbiter value could be used to indicate the disabled state.

If enabled, state machine 800 shifts to enabled state S2. If a subnet manager is enabled, during initialization it transitions in state machine 800 to discovering state S3. In this state, the subnet managers use subnet management packets to query ports that the subnet manager has access to. These packets are sent to all other nodes to gather information, including path delays of the subnet, concerning switches and end ports. Discovering state S3 is used during initialization of the subnet manager to discover devices on the subnet. In addition, this state also is used to discover other subnet managers on the subnet, determine which potential subnet manager is to become the master subnet manager, and to configure the subnet. The subnet manager sends messages, such as SubnGet(NodeInfo), SubnGet(PortInfo), and SubnGet(SMInfo) to obtain information about nodes, ports, and subnet managers.

In discovery state S3, a minimum amount of information is retrieved for use in determining whether another node has a higher priority. In the depicted examples, the information includes a physical address, GUID, in combination with a priority value used to determine priority for the master subnet manager. Further, a SM_Key also is obtained for authentication. A counter, act_cnt, containing the number of management operations performed and a state parameter indicating the current state of the subnet master also is returned in response to a request to discover other nodes.

When packets are sent in discovering state S3, a response within a particular amount of time is expected. A subnet manager identifies a (1) specifying a default delay time within which a port can be expected to respond to a request; (2) providing parameters enabling a switch to specify the delay times of packets in switches; and (3) providing parameters enabling a node to modify its default expected response time by specifying its expected response time in a response packet.

If a subnet manager having a higher priority is detected or a master subnet manager is detected, then state machine 800 shifts to a standby state S4. In standby state S4, the subnet manager may be placed into non-active state S5 by a master subnet manager. A subnet manager in standby mode periodically sends requests to a master subnet manager and waits for a response to the request. This process is also referred to as polling. The expected response time for the polling operation is obtained used time out values stored by the current master subnet manager. If the master subnet manager does not respond within the defined time out or if the current subnet master has not indicated its master SMLID, a state change occurs in which state machine 800 transitions from standby state S4 back to discovering state S3 to begin the discovery process again for selecting another master subnet manager.

If the master subnet manager responds to the poll, then state machine 800 remains in standby state S4. While in standby state S4, the subnet manager may receive a discover subnet manager packet from the master subnet manager requesting that it transition into discovering state S3. This could occur if a master subnet manager was experiencing a problem and wanted to handoff subnet management responsibility to another subnet manager.

In this example, a disable message from a master subnet manager causes the shift from standby state S4 to non-active state S5. Subnet managers in a non-active state do not participate in a polling scheme between the master subnet manager and other subnet managers in a standby state, such as standby state S4. State machine 800 may shift back into standby state S4 from non-active state S5 by receiving a standby message from a master subnet manager. In this manner, a master subnet manager that is receiving an excessive amount of polling packets, can automatically improve scalability of the fabric by placing some of the standby subnet managers in the non-active state.

In discovering state S3, state machine 800 shifts into master state S6 if the subnet manager discovers that it has the highest priority. While in master state S6, the subnet manager configures the subnet unless the subnet is already configured. Further, in this state the subnet is periodically monitored for changes in configuration. If a change in configuration is detected, the master subnet manager sends request packets to the appropriate ports to determine the specifics of the reconfiguration. If in master state S6, one or more subnet managers are discovered having a higher priority, a handover control packet may be sent to the master subnet manager having the highest priority. In response to receiving an acknowledge packet, state machine 800 shifts from master state S6 to standby state S4. In master state S6, if one or more subnet managers are discovered having a lower priority, the subnet manager awaits a handover control packet from the lower priority subnet manager. This event does not cause a state transition out of master state S6.

State machine 800 also may shift into master state S6 from standby state S4 if a handover message is received from a master subnet manager. This handover message is received when the master subnet manager hands over mastership of the subnet to the standby subnet manager. This situation may occur due to a failure in the current master or the current master subnet manager discovers a subnet manager executing state machine 800 has a higher priority, possibly as a result of a change in the fabric. State machine 800 will stay in master state S6 as long as the same master subnet manager remains master. If a handover occurs, state machine 800 will shift from master state S6 back to standby state S4 and acknowledge the handover of mastership of the subnet. The standby subnet managers then go back to the discovery state S3, to establish which standby subnet manager will now become master. The highest priority subnet manager then becomes master subnet manager, and it then transitions in the state machine to master state S6.

Figure 9:
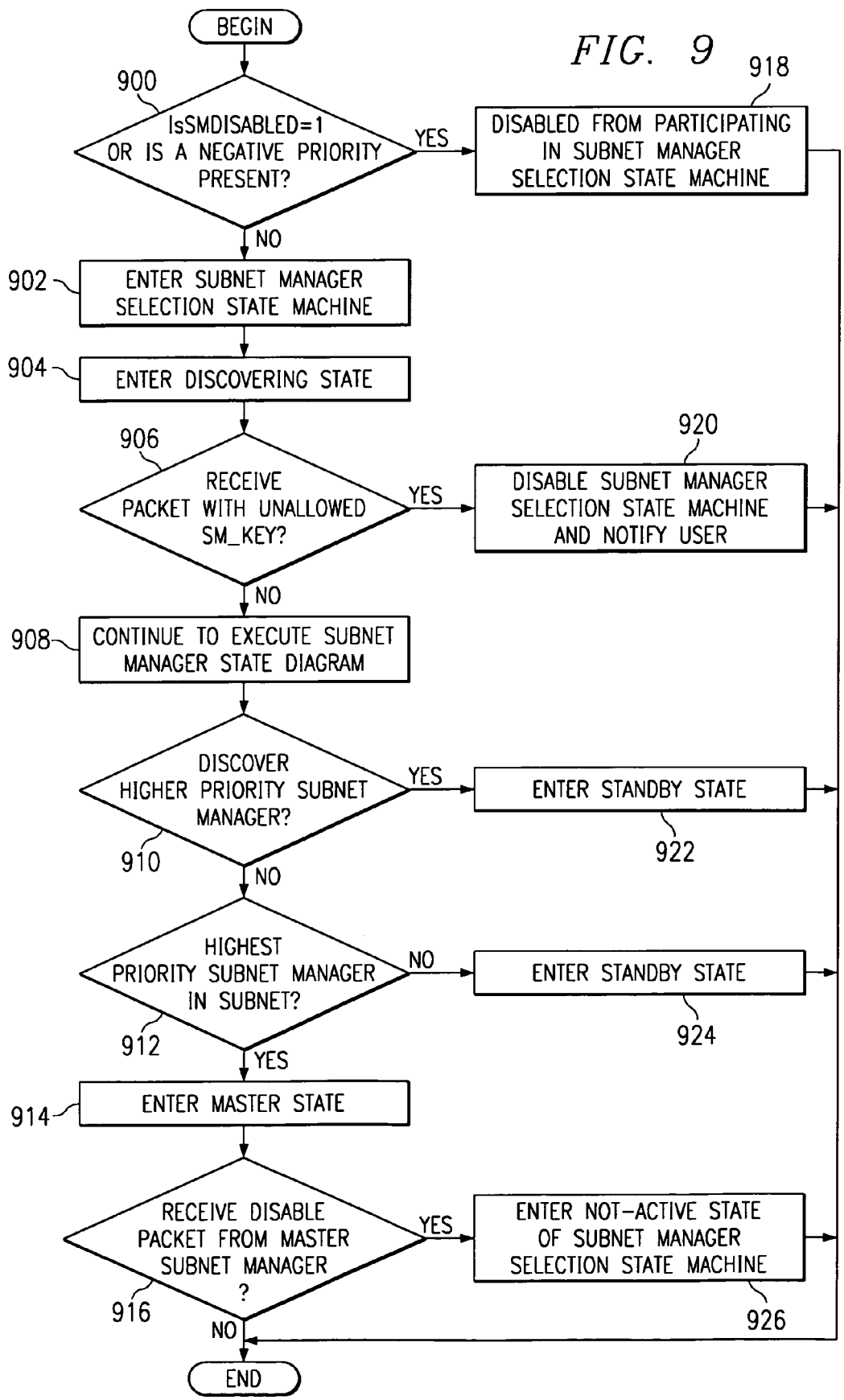
FIG. 9 is a flowchart of a process used for initializing a subnet manager in accordance with a preferred embodiment of the present invention.

Turning next to FIG. 9, a flowchart of a process used for initializing a subnet manager is depicted in accordance with a preferred embodiment of the present invention.

The process begins by determining whether IsSMDisabled equals one or if a negative priority is present (step 900). The variable IsSMDisabled may be set by a user to enable or disable a subnet manager from participating in selection of a master. This mechanism is used to reduce the number of standby subnet managers, which may poll a master subnet manager. If IsSMDisabled does not equal one or if a negative priority is not present, the SM selection state machine is entered (step 902). The selection state machine in this example is state machine 800 in FIG. 8.

Next, the discovering state is entered (step 904). During the discovery state, subnet managers transmit management datagrams (MADS) to devices in the subnet, in the process of determining what is located in the fabric. A determination is made as to whether a packet with an unallowed SM_Key is received (step 906). SM_Keys provide a level of security in the fabric. If during configuration a subnet manager attempts to participate in discovery with an improper SM_Key, it is disabled from further participation in the discovery process. If a packet with unallowed SM_Key is not received, continue to execute the SM state diagram (step 908).

A determination is then made as to whether a higher priority subnet manager is discovered (step 910). If a higher priority subnet manager is not discovered, a determination is then made as to whether it is the highest priority subnet manager in the subnet (step 912). If it is the highest priority subnet manager in the subnet, the master state is entered (step 914).

A determination is then made as to whether a disable packet is received by a subnet manager that is in standby state, from the master subnet manager (step 916). If a disable packet is not received from the master subnet manager, the subnet manager stays in standby state.

With reference again to step 900, IsSMDisabled equals one or if a negative priority is present, the subnet manager selection state machine is disabled for that particular subnet manager from participating (step 918) with the process terminating thereafter.

With reference again to step 906, if a packet with unallowed SM_Key is received, the subnet manager selection state machine is disabled for that particular subnet manager and the user is notified (step 920) with the process terminating thereafter.

With reference again to step 910, if a higher priority subnet manager is discovered, a standby state is entered for that particular subnet manager (step 922) with the process terminating thereafter. With reference again to step 912, if this is not the highest priority subnet manager in the subnet, a standby state is entered for that particular subnet manager (step 924) with the process terminating thereafter. With reference again to step 916, if a disable packet from the master subnet manager is received, a not-active state of subnet manager selection state machine is entered for that particular subnet manager (step 926) with the process terminating thereafter.

In one embodiment of the present invention, the mechanism for determining the master subnet manager, is to have positive value priorities indicate which subnet manager has the highest priority, with all zeros having the lowest priority, and with the highest positive value indicating the highest priority. In case of a tie, the subnet manager with the lowest QUID would have the higher priority. A tie occurs when both subnet managers have the same priority value. A negative value priority would indicate that the subnet manager is not allowed to participate in the selection of a master and the resulting polling scheme.

In another embodiment of the present invention, the mechanism for determining the master subnet manager employs a disable bit, set by user input outside of the subnet to disable the subnet manager. By disabling the subnet manager, the subnet manager is unable to participate in selection of a master subnet manager and the resulting polling scheme. This disable bit is also referred to as the IsSMDisable bit.

The present invention provides a method, apparatus, and computer implemented instructions for a priority override scheme to allow the customer to set (or modify previously set priorities) subnet manager priorities via out-of-band means (either prior to initialization, or after initialization). This mechanism allows the customer to select the subnet manager with the desired functionality. The present invention also allows for the customer to select which subnet managers will be allowed to participate in discovery and initialization and the polling scheme between the master subnet manager and standby subnet managers, allowing scalability of the SAN fabric. Since a SAN allows a very large number of subnet managers to reside on a subnet, limiting the number of subnet managers allowed to participate in initialization and the polling process is very important to scalability, since the polling traffic could potentially become large enough to prevent completion of the initialization, and even cause catastrophic failure of the subnet, and also bring the system or systems in the fabric down.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a network computing system for managing a plurality of subnet managers in the network computing system, the method comprising:
   receiving an identification of a set of subnet managers within the plurality of subnet managers;
   allowing the set of subnet managers to participate in a master election to select a master subnet manager;
   placing subnet managers other than the set of subnet managers in a dormant state; and electing the master subnet manager from the set of subnet managers through the master election, wherein other subnet managers within the number of subnet managers poll the master subnet manager to allow the other subnet managers to elect a new master subnet manager if the master subnet manager fails, wherein each of the subnet managers in the plurality of subnet managers implements a state machine, and wherein placing the subnet managers other than the set of subnet managers in a dormant state includes one of receiving user input designating that the state machines of the subnet managers, other than the set of subnet managers, are to be transitioned to a disabled state, and selectively transitioning the state machines of the subnet managers, other than the set of subnet managers, to a non-active standby state as determined by the master subnet manager based upon an amount of polling packets that are received by the master subnet manager.

2. The method of claim 1, wherein the other subnet managers are in a number such that polling of the subnet manager occurs without causing the master subnet manager to fail.

3. The method of claim 1, wherein polling response times for the set of subnet managers are identified and used in the master subnet election.

4. The method of claim 1, wherein placing the subnet managers, other than the set of subnet managers, in a dormant state includes automatically transitioning the state machines of the subnet managers, other than the set of subnet managers, to a non-active standby state if an excessive amount of polling packets are received by the master subnet manager.

5. The method of claim 1, wherein placing the subnet managers, other than the set of subnet managers, in a dormant state includes receiving user input designating that the state machines of the subnet managers, other than the set of subnet managers, are to be transitioned to a disabled state.

6. The method of claim 1, wherein the network computing system is a system area network.

7. A method for initializing a subnet manager in a network computing system, the method comprising:
   determining whether the subnet manager is enabled;
   determining an expected polling response time for the subnet manager;
   responsive to the subnet manager being enabled, polling other subnet managers for priority and status information;
   determining whether the subnet manager is to become a master subnet manager using priority information returned from other subnet managers; and
   responsive to another subnet manager in the network computing system having a higher priority than the subnet manager in the priority information, placing the subnet manager in a standby mode, wherein the subnet manager implements a state machine, and wherein the subnet manager may be disabled by one of receiving user input designating that the state machine of the subnet manager is to be transitioned to a disabled state and receiving a message from a master subnet manager that the state machine of the subnet manager is to be transitioned to a non-active standby state.

8. A network computing system comprising:
   a plurality of devices within a subnet linked together within the subnet via switches; and
   a plurality of subnet managers connected to the subnet, wherein a number of the subnet managers are enabled to participate in an election process to elect a master subnet manager and wherein subnet managers other than the number of subnet managers are in a standby mode such that the master subnet manager is polled by a remaining number of subnet managers within the number of subnet managers without overwhelming the master subnet manager with polling requests, and wherein each of the subnet managers in the plurality of subnet managers implements a state machine, and wherein the subnet managers may be placed in a dormant state of the state machine by one of receiving user input designating that the state machines of the subnet managers are to be transitioned to a disabled state, and selectively transitioning the state machines of the subnet managers to a non-active standby state as determined by the master subnet manager based upon an amount of polling packets that are received by the master subnet manager.

9. A network computing system for managing a plurality of subnet managers in the network computing system comprising:
   receiving means for receiving an identification of a set of subnet managers within the plurality of subnet managers;
   allowing means for allowing the set of subnet managers to participate in a master election;
   placing means for placing subnet managers other than the set of subnet managers in a dormant state; and
   electing means for electing a master subnet manager from the set of subnet managers through the master election, wherein other subnet managers within the number of subnet managers poll the master subnet manager to ensure that the other subnet manager are able to take over in case the master subnet manager fails, wherein the other subnet managers are in a number such that polling of the subnet manager occurs without overwhelming the master subnet manager with polling requests, wherein each of the subnet managers in the plurality of subnet managers implements a state machine, and wherein the placing means places the subnet managers other than the set of subnet managers in a dormant state in response to one of receiving user input designating that the state machines of the subnet managers, other than the set of subnet managers, are to be transitioned to a disabled state, and receiving a message from the subnet manager to selectively transition the state machines of the subnet managers, other than the set of subnet managers, to a non-active standby state as determined by the master subnet manager based upon an amount of polling packets received by the master subnet manager.

10. The network computing system of claim 9, wherein the other subnet managers are in a number such that polling of the subnet manager occurs without causing the master subnet manager to fail.

11. The network computing system of claim 9, wherein polling response times for the set of subnet managers are identified and used in the master subnet election.

12. The network computing system of claim 9, wherein the placing means places the subnet managers, other than the set of subnet managers, in a dormant state in response to receiving a message from the master subnet manager to automatically transition the state machines of the subnet managers, other than the set of subnet managers, to a non-active standby state in response to a determination that an excessive amount of polling packets being received by the master subnet manager.

13. The network computing system of claim 9, the placing means places the subnet managers, other than the set of subnet managers, in a dormant state in response to receiving user input designating that the state machines of the subnet managers, other than the set of subnet managers, are to be transitioned to a disabled state.

14. The network computing system of claim 9, wherein the network computing system is a system area network.

15. A data processing system for initializing a subnet manager in a network computing system comprising:
   first determining means for determining whether the subnet manager is enabled;
   second determining means for determining an expected polling response time for the subnet manager;
   polling means, responsive to the subnet manager being enabled, for polling other subnet managers for priority and status information;
   third determining means for determining whether the subnet manager is to become a master subnet manager using priority information returned from other subnet managers; and
   placing means, responsive to another subnet manager in the network computing system having a higher priority than the subnet manager in the priority information, for placing the subnet manager in a standby mode, wherein the subnet manager implements a state machine, and wherein the subnet manager may be disabled by one of receiving user input designating that the state machine of the subnet manager is to be transitioned to a disabled state and receiving a message from a master subnet manager that the state machine of the subnet manager is to be transitioned to a non-active standby state.

16. A computer program product in a computer readable medium for use in a network computing system for managing a plurality of subnet managers in the network computing system, the computer program product comprising instructions which when executed, cause the following steps to be performed:
   receiving an identification of a set of subnet managers within the plurality of subnet managers;
   allowing the set of subnet managers to participate in a master election;
   placing subnet managers other than the set of subnet managers in a dormant state; and
   electing a master subnet manager from the set of subnet managers through the master election, wherein other subnet managers within the number of subnet managers poll the master subnet manager to ensure that the other subnet manager are able to take over in case the master subnet manager fails, wherein the other subnet managers are in a number such that polling of the subnet manager occurs without overwhelming the master subnet manager with polling requests, and wherein each of the subnet managers in the plurality of subnet managers implements a state machine, and wherein the subnet managers may be placed in a dormant state of the state machine by one of receiving user input designating that the state machines of the subnet managers are to be transitioned to a disabled state, and selectively transitioning the state machines of the subnet managers to a non-active standby state as determined by the master subnet manager based upon an amount of polling packets that are received by the master subnet manager.

17. A computer program product in a computer readable medium for use for initializing a subnet manager in a network computing system, the computer program product comprising instructions which, when executed, cause the following steps to be performed:
   determining whether the subnet manager is enabled;
   determining an expected polling response time for the subnet manager;
   responsive to the subnet manager being enabled, polling other subnet managers for priority and status information;
   determining whether the subnet manager is to become a master subnet manager using priority information returned from other subnet managers; and
   responsive to another subnet manager in the network computing system having a higher priority than the subnet manager in the priority information, placing the subnet manager in a standby mode, wherein the subnet manager implements a state machine, and wherein the subnet manager may be disabled by one of receiving user input designating that the state machine of the subnet manager is to be transitioned to a disabled state and receiving a message from a master subnet manager that the state machine of the subnet manager is to be transitioned to a non-active standby state.

18. A data processing system comprising:
   a bus system;
   a channel adapter unit connected to a system area network fabric;
   a memory connected to the bus system, wherein the memory includes as set of instructions; and
   a processing unit connected to the bus system, wherein the processing unit executes the set of instructions to receive an identification of a set of subnet managers within the plurality of subnet managers; allow the set of subnet managers to participate in a master election to select a master subnet manager; place subnet managers other than the set of subnet managers in a dormant state; and elect the master subnet manager from the set of subnet managers through the master election, wherein other subnet managers within the number of subnet managers poll the master subnet manager to allow the other subnet managers to elect a new master subnet manager if the master subnet manager fails, wherein each of the subnet managers in the plurality of subnet managers implements a state machine, and wherein placing the subnet managers other than the set of subnet managers in a dormant state includes one of receiving user input designating that the state machines of the subnet managers, other than the set of subnet managers, are to be transitioned to a disabled state, and selectively transitioning the state machines of the subnet managers, other than the set of subnet managers, to a non-active standby state as determined by the master subnet manager based upon an amount of polling packets that are received by the master subnet manager.

* * * * *